Patented Oct. 19, 1926.

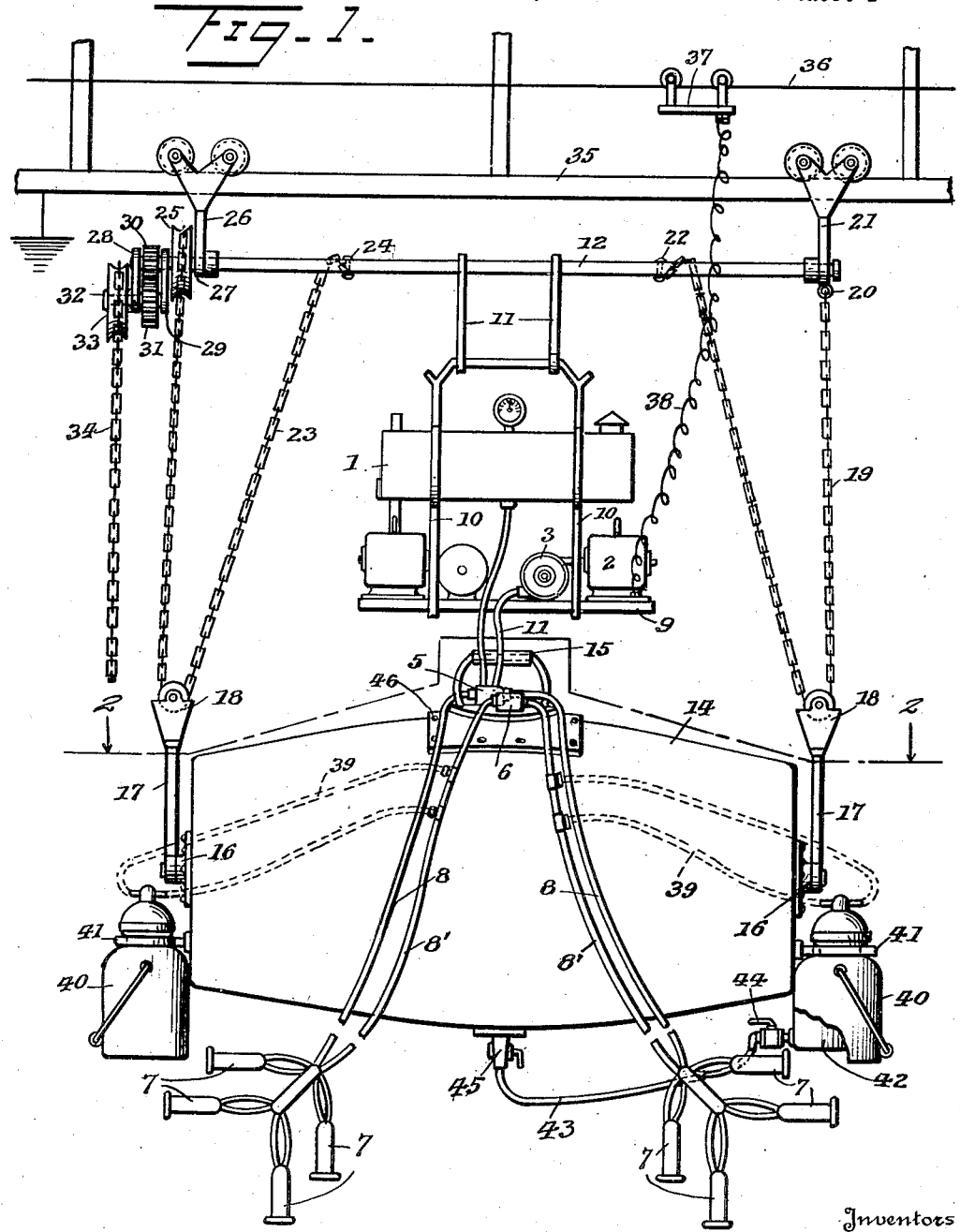

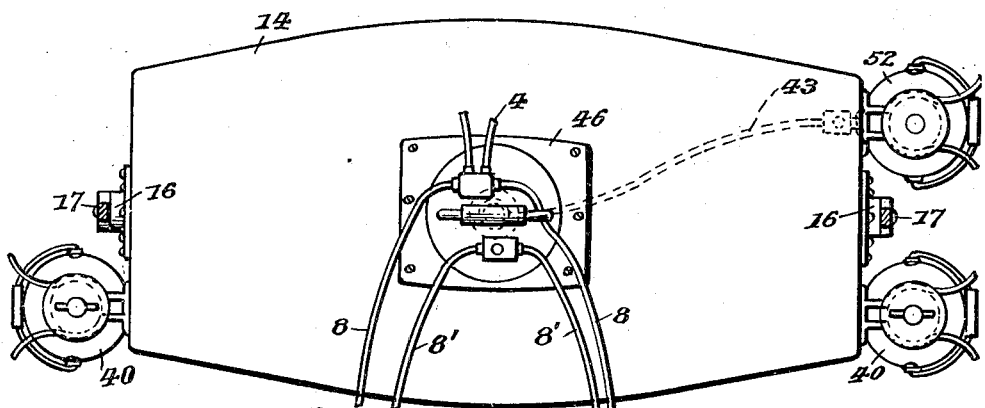
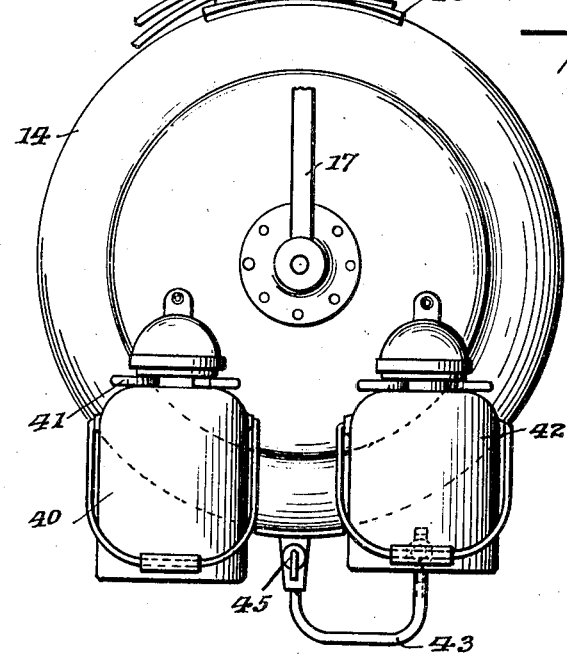

1,603,429

UNITED STATES PATENT OFFICE.

MILTON F. UPHAUS AND CLARENCE G. WESTERHOUSE, OF CONCORDIA, MISSOURI.

ATTACHMENT FOR MILKING MACHINES.

Application filed July 6, 1925. Serial No. 41,648.

Our invention relates to automatic milking machines and particularly to the attachments therefor, particularly described in the following specification, and has as some of its more important objects, that of providing a milking apparatus supported by an overhead track, whereby it may be conveniently moved from cow to cow as the milking proceeds. the provision of an electric trolley, combined with the track, whereby current for the electric motor for operating the machine may be supplied wherever the machine is moved, the provision of means for elevating and lowering the milk receptacle with relation to the cows and the separator and for convenience in handling, and the provision of milk weighing attachments, with means for taking the milk from the cow to a weighing can or to a main milk receptacle.

With these and other objects in view, our invention consists in the novel features of construction, combination and arrangement of parts as will be hereinafter referred to and more particularly pointed out in the specification and claims.

In the accompanying drawings—

Figure 1 is a side elevation of the complete machine;

Figure 2 is a plan view of the machine on the line 2—2 of Figure 1; and

Figure 3 is an end elevation of the main milk container.

Referring more particularly to the drawings by numerals of reference, 1 indicates generally an electric vacuum milking machine and may of itself consist of an arrangement familiar in the art, including such elements as the electric motor 2 which drives the vacuum pump 3, which latter, through the hose 4, connects with the manifolds 5 and 6, respectively, leading to the teat cups 7, through hose 8 and 8'. The electric vacuum milking machine, with the driving motor, etc., is supported on a base 9, suspended on hangers 10, which in turn are supported by swinging straps 11 from a rotary shaft 12.

A main milk receptacle 14 provided with a handle 15, and generally barrel-shaped, is provided on its ends with trunnions 16, journaled in bearings formed at the lower ends of arms 17. Each of these arms is provided with a pulley 18 and over one of them passes a chain or cable 19, one end of which is attached to an eye 20, fixed to the lower end of a trolley 21, and in which latter the shaft 12 is journaled at one end. The other terminal of the chain 19 is fixed to an intermediate portion of the said shaft 12, at 22 and is adapted to wrap around the shaft as it is rotated. Over the other pulley 18 passes a chain or cable 23, one end of which is fixed as at 24 to the rotary shaft 12, intermediate its ends, while the other end is fixed to and adapted to be wrapped around a drum 25, fixed on shaft 12 adjacent the end opposite to that to which the chain 19 is connected, this end of the shaft 12 being journaled at 27 in the lower end of a trolley 26.

Supported upon an extension 28 of the shaft 12, beyond the bearing 27 is a hoisting gear mechanism 29, including intermeshing gears 30 and 31, the former being keyed on the shaft extension 28, while the latter has fixed on its shaft 32 a drum 33 over which passes the operating chain 34.

The apparatus thus described, is suspended from a metal track 35, which extends throughout the length of the milking room at the rear of the cows, and thus permits the apparatus to be conveniently moved from cow to cow as the milking proceeds. Extending parallel with the track 35 is an electric trolley wire 36 supporting a wheeled trolley 37, and in practice, the current for operating the motor 2, passes through a circuit which includes trolley wire 36, conductor 38, the frame of the machine, wheeled trolleys 21 and 26 and metal conducting track 35.

During ordinary milking operation, the teat cups being connected with the cow, and the vacuum apparatus being set in operation, milk is drawn through hose 8, passing through manifold 5 into the main container 14. However, when it is desired to weigh the milk of a cow one of the hose 8' draws the milk from the particular cow being tested, and through a branch hose 39 into a testing can 40 supported by bracket 41 on the end of the main container 14, and while only one test can has been described, two are shown mounted respectively upon opposite ends of the container.

After weighing the milk in the test can 40, it is poured into a can or auxiliary receptacle 42, the upper end of which is provided with an inwardly opening automatically closing valve, so that it may be closed immediately after the pouring operation. The lower end is in communication through a hose 43 with the lower portion of the main container 14, and when valves 44 and 45 are opened, the milk is drawn into the latter container from the auxiliary can 42.

While the main container 14 has been sufficiently filled, it is moved along the track 35 until it is over the separator, when, through the hoisting gearing 29 it may be lowered, the hose 43 disconnected, valve 45 opened and said container drained. If necessary, the container may be swung by handle 15 on trunnions 16 and the manhole plate 46 removed for flushing and cleaning. Through the hoisting gearing the container 14 and the attachment thereto may be raised and lowered whenever it may be found necessary.

From the foregoing description of the construction of our improved apparatus, it will be seen that we have provided a simple, inexpensive and efficient means for carrying out the objects of the invention, and while we have particularly described the elements best adapted to perform the functions set forth, it is obvious that various changes in form, proportion, and in the minor details of construction may be resorted to, without departing from the spirit or sacrificing any of the principles of the invention.

Having described our invention what we claim as new is:—

1. A milking apparatus comprising a support, a vacuum milking machine carried by the support, a milk container also carried by the support and adjustable vertically with relation to the milking machine, flexible piping connecting the milking machine with the container, teat cups having flexible hose sections connected with the container, a pair of receptacles carried by said container, means for connecting either or both of the receptacles with the teat cups hose and means connecting one of the receptacles with the container.

2. A milking apparatus comprising a support, a vacuum milking machine carried thereby, a milk container also carried by said support and adjustable vertically with respect thereto, flexible conduits connecting said milking machine and the container, additional flexible conduits leading from said container, teat cups connected with the free ends of said additional conduits, receptacles removably supported at the ends of said container, and means for connecting said receptacles with the additional flexible conduits.

In testimony whereof we affix our signatures.

MILTON F. UPHAUS.
CLARENCE G. WESTERHOUSE.